United States Patent [19]
Heathwaite et al.

[11] 3,819,002

[45] June 25, 1974

[54] DRIVE SYSTEM

[75] Inventors: Hewart H. Heathwaite; Robert H. Mead, both of Ithaca, N.Y.

[73] Assignee: Borg-Warner Corporation, Chicago, Ill.

[22] Filed: Aug. 29, 1972

[21] Appl. No.: 284,691

[52] U.S. Cl. .................................. 180/32, 280/284
[51] Int. Cl. ............................................. B62m 9/02
[58] Field of Search ............... 180/32, 72; 280/284; 74/242.11 B, 242.15 B, 242.16, 219

[56] References Cited
UNITED STATES PATENTS

| | | |
|---|---|---|
| 529,267 | 11/1894 | Homan ................................ 74/219 |
| 654,182 | 7/1900 | Rupsch ............................. 280/288 |
| 844,892 | 2/1907 | Pfander............................. 74/242.16 |
| 896,078 | 8/1908 | Blankenheim ....................... 180/32 |

FOREIGN PATENTS OR APPLICATIONS

| | | |
|---|---|---|
| 1,150,961 | 1/1958 | France.................................. 180/32 |
| 223,559 | 3/1925 | Great Britain..................... 280/284 |
| 423,241 | 7/1947 | Italy.................................. 280/284 |

*Primary Examiner*—Kenneth H. Betts
*Attorney, Agent, or Firm*—Donald W. Banner

[57] ABSTRACT

A power driven vehicle having a drive chain transmitting power from an engine to a driven wheel capable of moving between various positions and means for maintaining substantially constant final drive chain tension for all wheel positions.

1 Claim, 4 Drawing Figures

PATENTED JUN 25 1974　　　　　　　3,819,002

DRIVE SYSTEM

BACKGROUND OF THE INVENTION

Present type motorcycle rear suspension has the rear wheel vertical travel pivot point located between the engine sprocket and rear wheel sprocket which results in varying drive chain tension as the wheel moves substantially vertically about the pivot point. This variation in drive chain tension causes shock loading of the drive chain in excess of the working load due to horsepower transmitted to the rear, driven, wheel in the form of shock loads and in some situations results in premature chain failure due to fatique or tensile breakage. This situation is most severe in off-road type usage of the cycle.

THE INVENTION

According to this invention, an idler sprocket is located at the correct point to the wheel pivot point, so that, as the driven wheel moves substantially vertically about the pivot point, the idler sprocket support pivots and maintains nearly or substantially constant drive chain tension by taking up the slack that would normally occur in the lower drive chain strand. This substantially reduces the shock loading in excess of the horsepower transmitted load, resulting in increased chain life.

The invention may be further characterized the the use of a bell crank pivoted about the driven wheel pivot point, the bell crank carrying the idler sprocket on one arm. The other arm of the bell crank is connected to the axle of the driven wheel, so as to move with the axle and thus move as the driven wheel moves substantially vertically about the pivot point in response to the terrain traversed by the vehicle.

THE DRAWINGS

DETAILED DESCRIPTION

Figure 1:
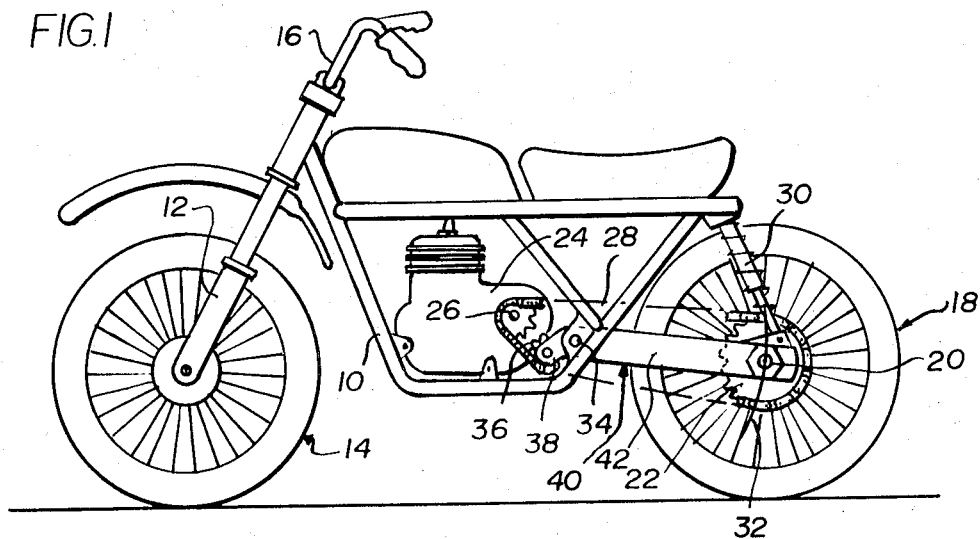
FIG. 1 is a side view of a motorcycle incorporating the present invention.
Figure 2:
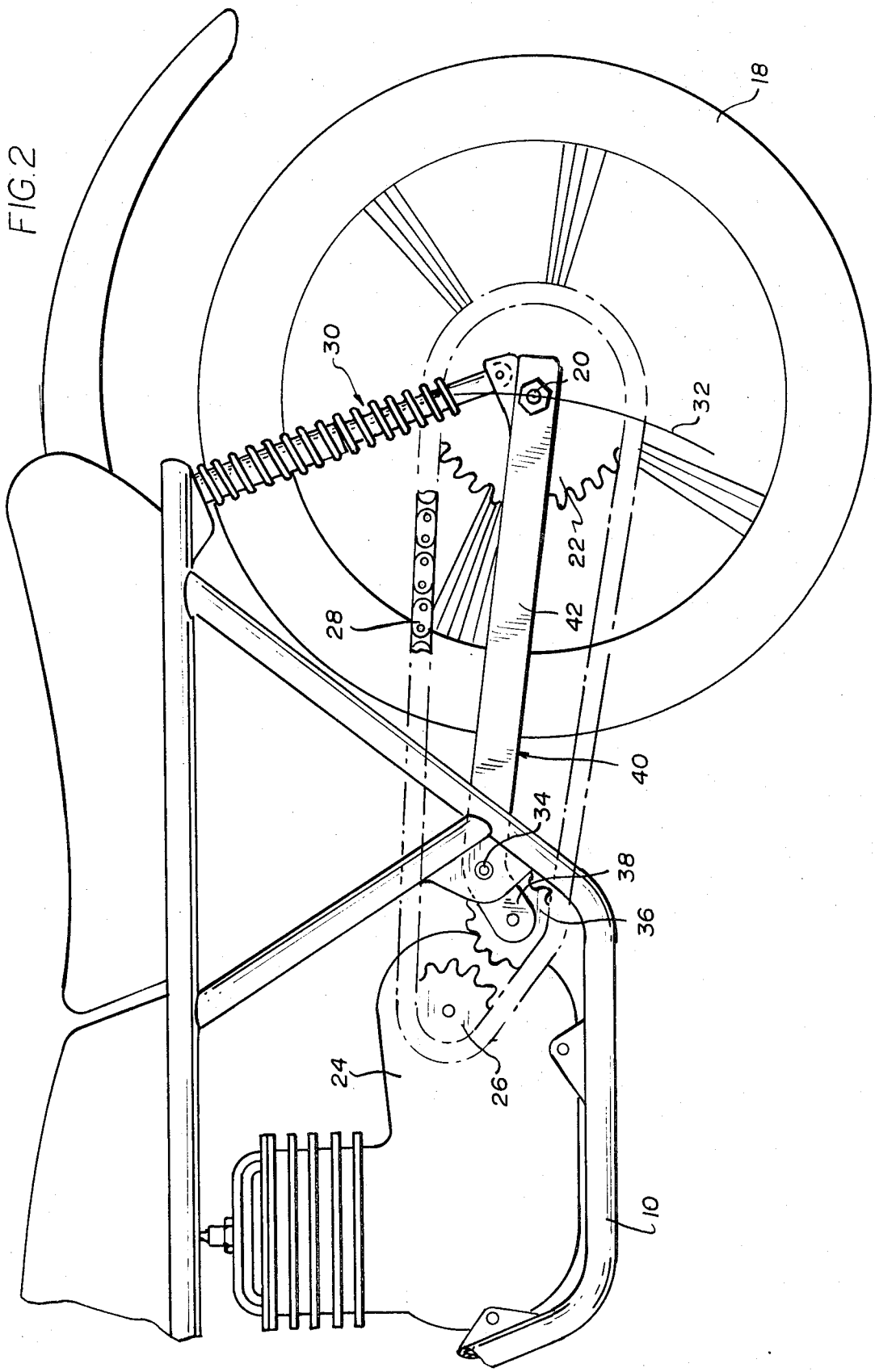
FIG. 2 is an enlarged view of a portion of FIG. 1.

Turning now to FIGS. 1 and 2 of the drawings, there is illustrated a typical motorcycle having a frame 10, a front wheel fork 12, a front wheel 14, handle bars 16, a rear, driven wheel 18 with an axle 20, a sprocket 22 connected to the axle 20, a motor 24 having a driving sprocket 26 attached to its drive shaft, and a drive chain 28 between the sprockets 26 and 22 to transmit power from the engine 24. The driven wheel 18 is suspended from the frame 10 by means of a pair of shock absorbers 30 (only one of which is shown) connected to the frame 10 and to the rear wheel axle 20. The rear wheel 18, because of its suspension, is movable substantially vertically between its normal position, as illustrated, and upper and lower positions, as permitted by the shock absorbers 30. Movement of the rear axle 20 is actually in an arcuate path, as identified by the reference character 32 having a center or pivot point 34. In order to maintain substantially constant tension in the chain 28, an idler sprocket 36 is provided which is supported for rotation, as is needed, on an arm 38 of a bell crank 40 which is also pivoted about the center or pivot point 34. The other arm 42 of the bell crank 40 is connected to the rear wheel axle 20. Thus movement of the rear wheel axle along its path of travel on arc 32, causes movement and change of position of the idler sprocket 36.

Figure 3:
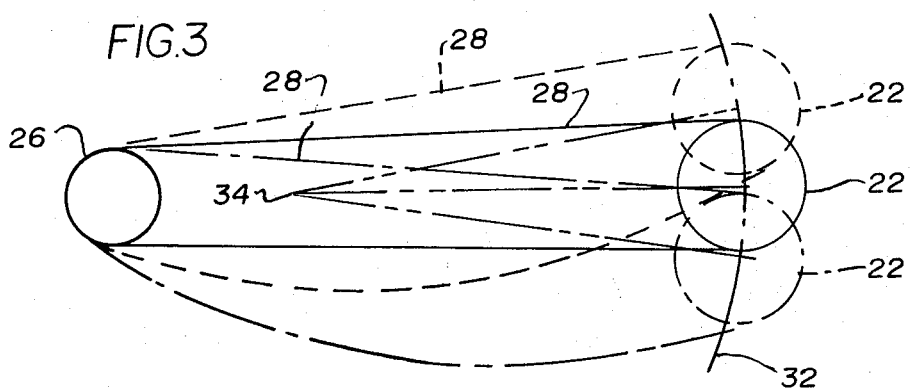
FIG. 3 is a sketch showing the prior art drive system under various conditions.
Figure 4:
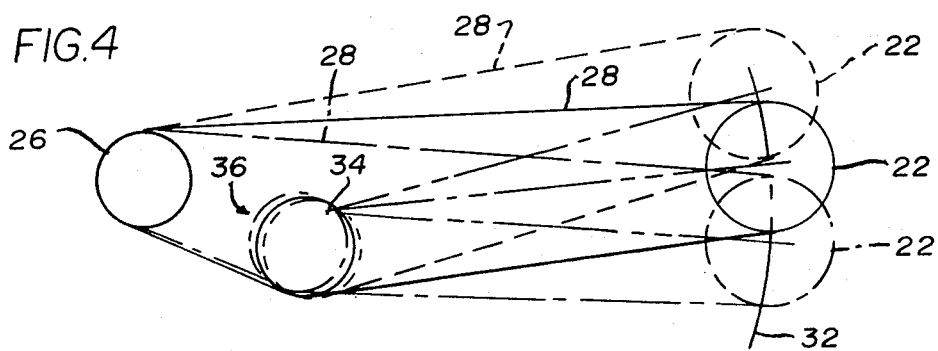
FIG. 4 is a sketch showing the drive system according to this invention under conditions similar to that shown in FIG. 3.

To more fully understand this invention, attention is directed to FIGS. 3 and 4. The normal and extreme upper and lower positions of the rear wheel sprocket are identified by proper legends and the drive chain between the motor sprocket and the rear wheel sprocket is illustrated for these positions by different broken lines. In FIG. 3, without the idler sprocket of this invention, it can be seen that when the rear wheel is in its normal position, the drive chain is properly tensioned between the motor and rear wheel sprockets; but at other positions and especially at the upper and lower positions of the drive wheel, the drive chain becomes slack and is not properly tensioned.

In FIG. 4, illustrating the present invention, it is seen that for all positions of the rear wheel, the drive chain is substantially constant tensioned.

We claim:

1. In a power driven wheeled vehicle having an engine with a connected sprocket, a driven wheel with a sprocket on its axle, and a drive chain connecting said sprockets for transmitting power from said engine to said driven wheel, means mounting said driven wheel by its axle for limited movement between normal, lower and upper positions about a pivot point located between the engine and the wheel in response to the terrain traversed by said vehicle, the improvement comprising:

an idler sprocket engaging said drive chain to maintain substantially constant final drive chain tension for all positions of said drive wheel;

a bell crank pivoted about said pivot point and having a pair of arms extending in different directions from said pivot point, one of said arms carrying said idler sprocket and the other of said arms being connected to said driven wheel axle to vary the position of said idler sprocket with respect to said drive chain in response to the positions of said drive wheel axle.

* * * * *